Nov 1, 1949.  V. J. DEVINE ET AL  2,486,467
ROTARY HYDRAULIC MOTOR HAVING SPRING
ACTUATED RADIALLY SLIDING VANES
Filed July 9, 1945  2 Sheets-Sheet 1
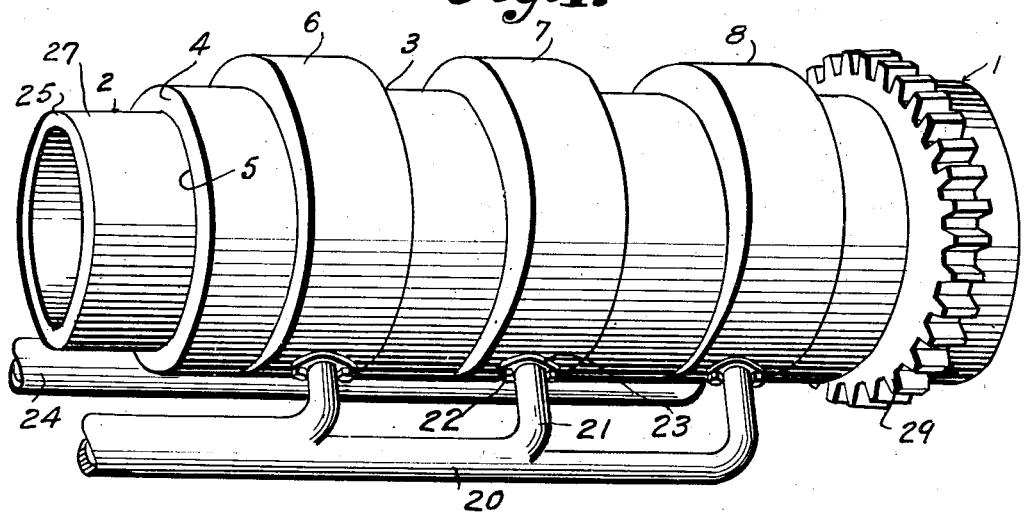
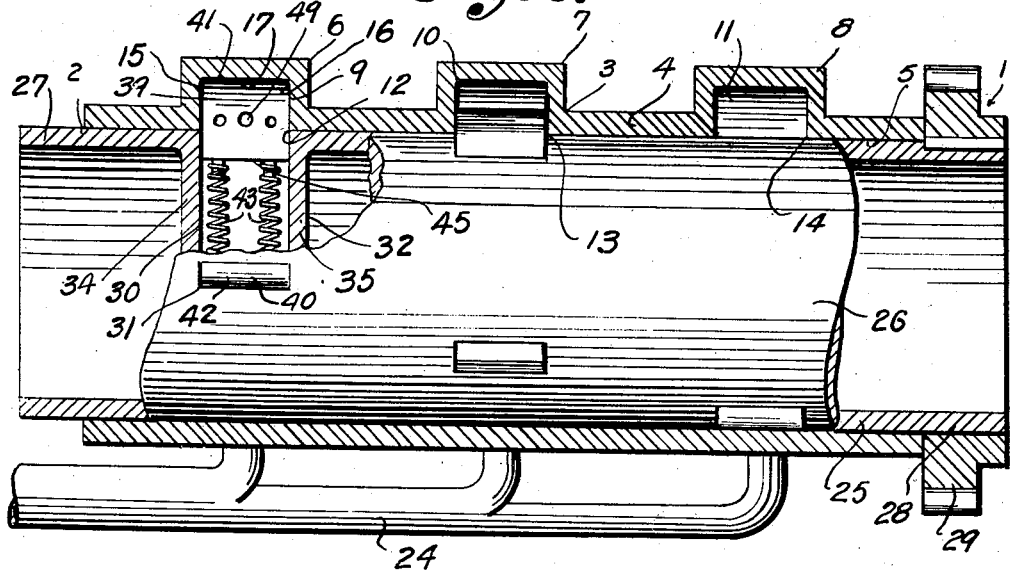
INVENTORS.
Verbol J. Devine &
BY Lawrence V. Devine
ATTORNEYS.

Nov 1, 1949.     V. J. DEVINE ET AL     2,486,467
ROTARY HYDRAULIC MOTOR HAVING SPRING
ACTUATED RADIALLY SLIDING VANES
Filed July 9, 1945     2 Sheets-Sheet 2

INVENTORS.
Verbol J. Devine
BY Lawrence V. Devine

Fishburn & Mullendore
ATTORNEYS.

Patented Nov. 1, 1949

2,486,467

UNITED STATES PATENT OFFICE 2,486,467

ROTARY HYDRAULIC MOTOR HAVING SPRING ACTUATED RADIALLY SLIDING VANES

Verbol J. Devine and Lawrence V. Devine, Kansas City, Mo.

Application July 9, 1945, Serial No. 604,107

4 Claims. (Cl. 121—86)

1

This invention relates to motors and similar devices including a stator and a rotor in which rotation of the rotor involves flow of fluid medium therebetween.

The principal object of the invention is to provide a device of this character of simple, inexpensive construction and comprising relatively few parts.

Other objects of the invention are to provide a rotor and stator of tubular form and having a plurality of rotor vanes arranged in circumferential spaced relation along the length of the tubes so that the vanes are successively effective; to provide a vane arrangement that prevents loss of fluid through the exhaust port; to prevent entrapment of fluid medium tending to reduce efficiency of operation; and to provide a vane arrangement including a vane adapted to function as a piston and a following vane arranged to serve as a valve.

In accomplishing these and other objects of the invention we have provided improved structure, the preferred form of which is illustrated in the accompanying drawings wherein:

Fig. 1 is a perspective view of our invention embodied in a motor.

Fig. 2 is a longitudinal section through the motor illustrated in Fig. 1 with a part of the inner tube or rotor being shown in elevation.

Figure 3:
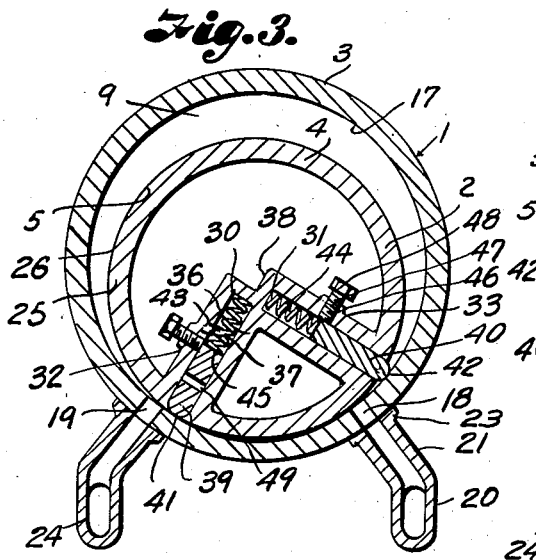
Figs. 3, 4 and 5 are cross sectional views through the motor showing different positions of one of the piston vanes and its cooperating valve vane.

Referring more in detail to the drawings:

1 designates a motor constructed in accordance with the present invention and which includes a rotor 2 and stator 3. The stator 3 includes a tube-like body 4 of cylindrical form and having an inner cylindrical bearing surface 5. Located in spaced relation along the length of the stator is a plurality of substantially cylindrical projections 6, 7 and 8 with their axes in coaxial alignment and offset from the axis of the cylindrical bearing surface 5. Formed internally of each projection 6, 7 and 8 is a passageway 9, 10 and 11 respectively opening inwardly through the bearing surface 5 as indicated at 12, 13, and 14 (Fig. 2). The passageways may be of any desired cross sectional shape but are here illustrated as rectangular in form and varying from a maximum depth at one diametrical side of the stator to a tangent with the bearing surface 5 at the opposite side of the stator, thereby providing crescent shaped sides 15

2 and 16 and an interconnecting cylindrical circumferential face 17. The stator is provided in registry with each of the passageways on opposite sides of the tangent point between the surfaces 17 and 5 with an intake port 18 and an exhaust port 19. The intake ports of all the passageways are connected by a manifold 20 having branches 21 leading to the respective ports and which are secured thereover by fastening devices 22 extending through flanges 23 on the terminal ends of the branches and into threaded sockets in the stator. All of the exhaust ports are similarly connected by an exhaust manifold 24. The rotor 2 also includes a cylindrical tube-like body 25 having an exterior bearing surface 26 cooperating with the bearing surface 5 to form a rotary seal between the rotor and stator. The seal has substantial area on the respective sides of the passageways to prevent leakage and provide ample bearing surface. The rotor is preferably longer than the stator to provide projecting ends 27 and 28 to one of which a ring gear 29 or other suitable power takeoff such as a pulley may be connected.

Formed within the rotor in registry with the openings 12, 13 and 14 of each of the crescent-shaped passageways 9, 10 and 11 are pairs of substantially rectangular shaped sockets 30 and 31 extending radially of the rotor and opening through the bearing face 26 thereof at points corresponding with the space between the intake and exhaust ports. The sockets are preferable formed in inwardly extending bosses 32 and 33 having walls 34—35 and 36—37 connected at substantially the longitudinal axis of the rotor by ends 38.

Figure 4:
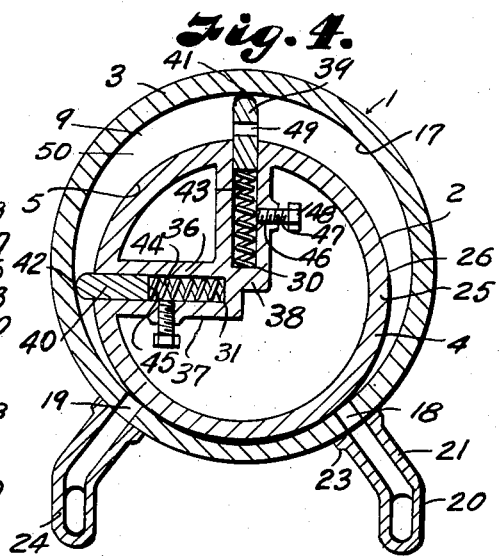

Slidable in each of the sockets are vanes 39 and 40 having outer edges 41 and 42 retained in bearing contact with the cylindrical faces 17 of the passageways by coil springs 43 and 44, one end of the springs bearing against the bottom 38 of the sockets and the opposite end against the inner edge 45 of the vanes as shown in Figs. 2 and 3. The vanes are of suitable dimensions to be closely slidable in the sockets and are of sufficient depth between the end edges 41—42 and 45 to maintain a seal with the socket walls when the vanes are located in the portion of the passageways when moved through the maximum depth of the passageways as shown in Fig. 4. The outer walls 34 of the sockets have threaded openings 46 in which are mounted threaded shanks 47 of set screws 48 for a purpose later described.

Each vane 40 constitutes a power piston and each vane 39 a trailing valve cooperating therewith to close the crescent shaped passageway between the intake and exhaust ports during movement of the piston vane between the intake and exhaust ports on the tangent side of the rotor and stator.

Figure 5:
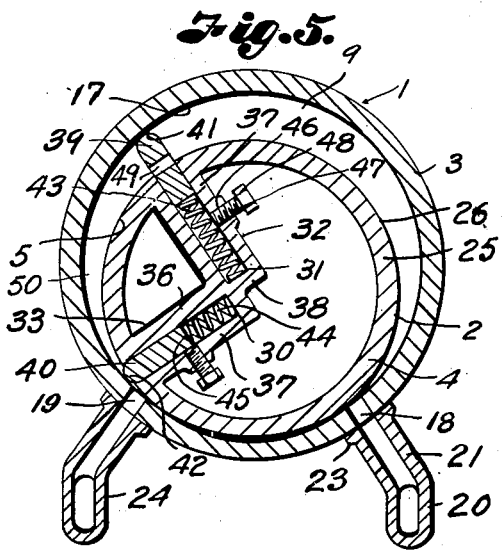
Figure 6:
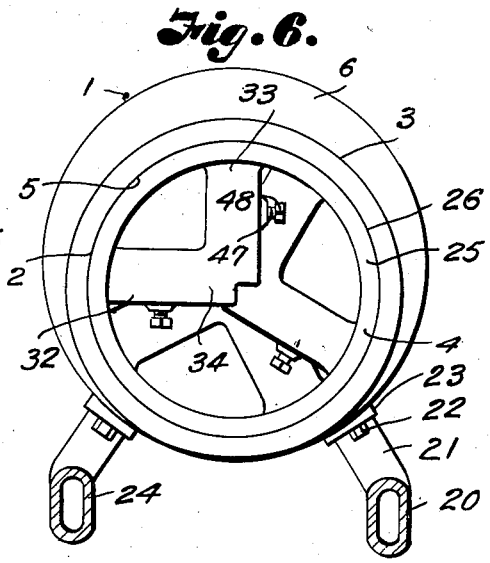
Fig. 6 is an end view of the motor, the intake and exhaust manifolds being shown in transverse section.

In order to prevent entrapment of pressure fluid between the piston and valve vanes, the valve vane is provided with one or more transverse ports 49 located in inwardly spaced relation with the outer bearing edges 41 of the valve vanes as shown in Fig. 3 whereby the ports are closed at the narrowest ends of the passageways but are exposed to interconnect the space 50 between the vanes with the intake sides of the passageways when the valve vanes are moving in the deepest portion of the passageways to prevent trapping and compression of the fluid medium between the piston and valve vanes when the vanes are in the position shown in Figs. 4 and 5.

Attention is also directed to the fact that the ports are so spaced so they are substantially closed after the piston vanes have opened the exhaust ports, thereby preventing any loss of pressure fluid through the passageway when the exhaust ports are uncovered by the pistons.

In assembling the rotor within the stator the springs 43 and 44 are placed in position within the sockets 30 and 31 followed by the vanes 39 and 40 which are supported thereby. The vanes are then depressed within the sockets so that the outer edges 41 thereof are at least even with the bearing surface 26 of the rotor 2. The set screws 48 are then tightened so that the ends thereof engage the vanes to hold them in retracted position against action of their supporting springs. Access is had to the set screws through the open ends 51 of the rotor by means of a wrench (not shown). The rotor 2 may then be sleeved within the stator 3 to register the vanes with their respective passageways. The ring gear 29 is then applied to one end of the rotor. The set screws 48 are then loosened so that the springs 43 and 44 project the vanes into the respective passageways. Then, when pressure fluid is admitted through the intake manifold 20 the pressure fluid acts against the power vane 40. For example, in Fig. 3, the pressure fluid is being admitted to the narrow end of the crescent-shaped passageway to act against the power vane 40 to effect movement of the rotor in an anti-clockwise direction. As the power vane moves into the portion of increasing depth, the springs project the vane to maintain a bearing contact of the edge 42 with the face 17 of the passageway. When the pressure fluid is steam or the like, expansion thereof in the passageway continues movement of the power vane to bring the valve vane across the port 18 whereupon the valve vane is effective in continuing rotation of the rotor as shown in Fig. 4. As the valve vane approaches the portion of the passageway having substantial depth and the power vane is moved into the constricted end of the passageway approaching the exhaust port, the ports 49 in the valve vane are exposed from the face of the rotor so as to interconnect the intake side of the valve vane with the space 50. Thus, any fluid trapped between the vanes is relieved through the ports 49 to cooperate with the pressure fluid being admitted through the intake port on the intake side of the respective vanes. The passageway on the forward side of the power vane (Figs. 4 and 5) is open to the exhaust port and expended steam on the previous power cycle is expelled through the exhaust port 19 into the exhaust manifold 24. As the piston vane opens the exhaust port to the retractive side thereof, the valve vane has moved sufficiently to cause closure of the ports 49 therein to thereby close connection between the intake and exhaust ports by way of the crescent-shaped passageways.

The other vane assemblies operate in a similar manner and in successive timing so that a continuous power thrust is exerted entirely around the axis of rotation.

From the foregoing it is obvious that we have provided a stator and rotor structure that is of simple and inexpensive construction and with the use of the power and valve vanes a simple seal is maintained between the intake and exhaust ports so as to avoid loss of power fluid during a portion of the cycle of rotation.

It is also obvious that by spacing the pairs of vanes or the respective passageways uniformly about the periphery of the rotor a substantially continuous turning thrust may be effected on the rotor to assure uniform application of power to any mechanism driven by the motor.

While we have not illustrated support for the motor it is obvious that it may be carried by suitable brackets or lugs projecting from the sides of the stator to suit any particular installation.

What we claim and desire to secure by Letters Patent is:

1. A device of the character described including a stator having an annular wall forming a rotor chamber provided with circumferentially spaced inlet and exhaust ports and having a crescent-shaped passageway interconnecting said ports and opening inwardly of said chamber, a rotor rotatable coaxially within said rotor chamber and having radial vane sockets spaced apart circumferentially of the rotor substantially corresponding to the spacing of said ports, an imperforate piston vane reciprocable radially in one of said sockets and movable through said crescent-shaped passageway responsive to fluid pressure admitted through said inlet port, and a valve vane similarly operable in the other of said sockets and having an aperture for passing pressure fluid to act on the piston vane when the valve vane passes the inlet port and becomes substantially extended, said vane port being located in said vane to be valved by sliding of the vane into its socket when the piston vane reaches the exhaust port to prevent escape of pressure fluid from the inlet port through the crescent-shaped passageway to said exhaust port.

2. A device of the character described including a stator having an annular wall forming a rotor chamber provided with circumferentially spaced inlet and exhaust ports and having a crescent-shaped passageway interconnecting said ports and opening inwardly of said chamber, a rotor rotatable coaxially within said rotor chamber and having radial vane sockets spaced apart circumferentially of the rotor substantially corresponding to the spacing of said ports, an imperforate piston vane reciprocable radially in one of said sockets and movable through said crescent-shaped passageway responsive to fluid pressure admitted through said inlet port, a valve vane similarly operable in the other of said sockets and having an aperture for passing pressure fluid to act on the piston vane when the valve vane passes the inlet port and becomes substantially extended, said vane port being located in said vane to be valved by sliding of the vane into its socket when the piston vane reaches the exhaust port to prevent escape of pressure fluid from the inlet port through the crescent-shaped passageway to said exhaust port, and springs carried by the rotor and exerting pressure against said vanes to yieldingly retain said vanes in projected position within said crescent-shaped passageway.

3. A device of the character described including a stator having an open end tube-like wall forming a rotor chamber provided with circumferentially spaced inlet and exhaust ports and having a crescent-shaped passageway interconnecting said ports, a rotor rotatable coaxially within said stator chamber and having radial vane sockets spaced apart circumferentially of the rotor, an imperforate piston vane slidable in one of said sockets and movable through said crescent-shaped passageway responsive to fluid pressure admitted through said inlet port, a valve vane similarly operable in the other of said sockets and having an aperture for passing pressure fluid to act on the piston vane when the valve vane passes the inlet port and becomes substantially extended, said vane port being located in said vane to be valved by sliding of the vane into its socket when the piston vane reaches the exhaust port to prevent escape of pressure fluid from the inlet port through the crescent-shaped passageway to said exhaust port, springs carried by the rotor and exerting pressure against said vanes to yieldingly retain said vanes in projected position within said crescent-shaped passageway, and means for retaining said vanes in retracted position within the rotor for sliding the rotor into the open end of the tube-like stator when the rotor is to be assembled in said stator.

4. A device of the character described including an elongated tube-like stator provided with longitudinally spaced sets of inlet and exhaust ports, the inlet port of each set being spaced circumferentially from the exhaust port, said tube-like stator having crescent-shaped passageways interconnecting the ports of each set of ports, a tube-like rotor rotatable coaxially within said tube-like stator and having pairs of radial sockets registering with said passageways and the sockets in each pair spaced apart circumferentially of the rotor, imperforate piston vanes slidable in one of each pair of sockets and movable through said crescent-shaped passageway responsive to fluid pressure admitted through said inlet ports, valve vanes similarly operable in the other of said sockets and each having an aperture for passing pressure fluid to act on the piston vanes when the valve vanes pass the inlet ports and becomes substantially extended, said vane ports being located in said valve vanes to be valved by sliding of the vanes into their sockets when the piston vanes reach the exhaust ports to prevent escape of pressure fluid from the inlet ports through the crescent-shaped passageways to said exhaust ports, and springs carried by the rotor and exerting pressure against said vanes to yieldingly retain said vanes in projected position within said crescent-shaped passageways.

VERBOL J. DEVINE.
LAWRENCE V. DEVINE.

REFERENCES CITED

The following references are of record in the file of this patent:

UNITED STATES PATENTS

| Number | Name | Date |
|---|---|---|
| 600,723 | Johnson | Mar. 15, 1898 |
| 776,431 | Severance | Nov. 29, 1904 |
| 858,144 | Bey | June 25, 1907 |
| 967,108 | Dargin | Aug. 9, 1910 |
| 1,009,362 | Wester | Nov. 21, 1911 |
| 1,404,583 | Coffelt | Jan. 24, 1922 |
| 1,953,378 | Vias | Apr. 3, 1934 |

FOREIGN PATENTS

| Number | Country | Date |
|---|---|---|
| 18,022 | Great Britain | 1912 |